United States Patent [19]

Ridd et al.

[11] Patent Number: 5,032,794

[45] Date of Patent: Jul. 16, 1991

[54] METHOD AND APPARATUS FOR MONITORING CHANGES IN UNDERWATER SEDIMENT LEVELS

[75] Inventors: Peter V. Ridd; John L. Nicol; Eric Wolanski, all of Townsville, Australia

[73] Assignees: James Cook University of Northern Queensland; Australian Institute of Marine Science, Australia

[21] Appl. No.: 519,871

[22] Filed: May 7, 1990

[30] Foreign Application Priority Data

May 8, 1989 [AU] Australia ................ PJ4069

[51] Int. Cl.$^5$ ............... G01V 3/02; G01V 3/08
[52] U.S. Cl. ................... 324/365; 324/697; 324/699; 324/716; 324/724; 73/304 R; 340/612
[58] Field of Search ............. 324/354, 357, 363, 365, 324/366, 367, 369, 370, 371, 373–375, 697, 699, 713, 715, 716, 724; 73/304 R; 340/612, 617

[56] References Cited

U.S. PATENT DOCUMENTS

| | | | |
|---|---|---|---|
| 3,182,250 | 5/1965 | Mayes | 324/365 |
| 3,548,304 | 12/1970 | Lohnes | 324/365 X |
| 4,287,472 | 9/1981 | Pan et al. | 324/699 |
| 4,287,756 | 9/1981 | Gallagher | 73/304 R X |
| 4,298,840 | 11/1981 | Bischoff et al. | 324/365 |
| 4,652,811 | 3/1987 | Kwiat et al. | 73/304 R X |
| 4,745,803 | 5/1988 | Haavasoja | 324/699 X |

FOREIGN PATENT DOCUMENTS 2423776 12/1979 France ................ 324/365

OTHER PUBLICATIONS

James R. Wait, "Geo-Electromagnetism," *Academic Press,* pp. 1–15, 12/1982.
I. J. Won, "The Geometrical Factor of a Marine Resistivity Probe with Four Ring Electrodes," IEEE Journal of Oceanic Engineering, vol. OE-12, No. 1, pp. 301–303 (Jan. 1987).
T. J. G. Francis, "Resistivity Measurements of an Ocean Floor Sulphide Mineral Deposit from the Submersible Cyana," Marine Geophysical Researches, vol. 7, pp. 419–438, 12/1985.

*Primary Examiner*—Kenneth A. Wieder
*Assistant Examiner*—Warren S. Edmonds
*Attorney, Agent, or Firm*—Nixon & Vanderhye

[57] ABSTRACT

Changes in underwater sediment level in a marine environment are monitored electronically using a probe embedded in the sediment. The probe includes an electrical current source to generate an electric field extending across the sediment interface. Voltage measurements are taken at at least three sensors on the probe whose positions are known relative to the current source. The height of the sediment interface relative to the current source can then be calculated, and logged, and changes in sediment level can be monitored. The conductivities of the sediment and seawater can also be calculated by taking additional voltage measurements.

19 Claims, 7 Drawing Sheets

Fig. 5Cont.

METHOD AND APPARATUS FOR MONITORING CHANGES IN UNDERWATER SEDIMENT LEVELS

This invention relates to a method and apparatus for measuring changes in the level of underwater sediment, such as changes in seabed level.

Although the invention will be described with reference to a system of measuring changes in the level of underwater sediment, particularly seabed height, the invention also has general application in the location and depth measurement of conductivity boundaries in layered structures. For example this invention may be applied to measure the height of water on a wave staff mounted vertically across the air-sea surface.

In many marine sedimentation studies, a knowledge of the changes in the vertical level of the sediment/seawater interface is often required. In the past, coastal engineers and geomorphologists have often used stakes driven into the sand to determine beach profiles with measurements being taken at low tides. Apart from the disadvantages of being very time consuming, such methods are unsuitable for use below the low tide mark and give little or no information during the remainder of the tidal cycle, which is when most erosion or deposition occurs. A time series of measurements is sometimes required in order to relate erosional or depositional processes to other phenomena such as wave energy or current velocity. This can be highly labour intensive using conventional methods, and is in some instances impossible, particularly in areas of high wave energy.

In order to overcome the abovedescribed disadvantages of prior art methods, this invention provides apparatus which enables seabed or other underwater sediment levels to be measured automatically and continuously to thereby provide accurate time-resolved data in sediment dynamics. Measurement can be made over long periods (e.g. many months) and with the option of having short sampling intervals (e.g. a few seconds).

In one broad form, the present invention provides a method measuring changes in underwater sediment level, the method comprising the steps of:

deploying a probe device at a fixed location within operative range of the surface level of the sediment;

establishing a source of current at the probe device to create an electric field therearound;

measuring the voltage potential at at least three positions on the probe device at known distances from the current source; and calculating the distance of the surface level of the sediment from the probe device at successive time intervals.

Typically, the invention is used for measuring changes in seabed sediment level.

In another form, the present invention provides apparatus for measuring changes in underwater sediment level, comprising:

probe means adapted to be deployed in use at a fixed location within operative range of the sediment/water interface, the probe means having (i) a current source for establishing an electrical field therearound, and (ii) voltage sensing means at at least three locations at known positions relative to the current source;

means for measuring the voltage at each voltage sensing means; and electronic computation means connected to the probe means and the voltage measuring means for calculating the distance of the sediment/water interface from the probe means at successive intervals of time.

In the preferred embodiment of the invention, the apparatus is designed for monitoring changes is seabed sediment level. In this embodiment, the apparatus comprises a sensor or probe adapted to be deployed in the marine environment at a fixed location within operative range of the sediment/seawater interface, the sensor or probe having an electrical current source for establishing an electric field therearound, and means for measuring the voltage potential at at least three points on the sensor or probe at known distances from the current source, the apparatus further comprising electronic computation means for calculating the level of the marine sediment relative to the sensor or probe from the measured voltages using predetermined equations.

Typically, the probe device is an elongate member, such as a rod, which is at least partially embedded in west sediment under the seawater and left in place. The probe device is connected by cable to a land-based or underwater control centre which includes a power supply for establishing the current source at the probe, and electronic computation means such as a microprocessor. Advantageously an automatic logging facility is also incorporated at the control centre. The voltage potentials can be measured at predetermine intervals to obtain an indication of the erosion and siltation pattern of the marine sediment, e.g. beach sand, over a period of time. The current source need only be activated when voltage measurements are being taken.

The sampling intervals can be preselected to suit the particular erosion/siltation behaviour being observed. For example, the response time of the probe is such that the effects fo single waves may be observed, or the effects of long term events such as storms, tidal cycles or seasons can be monitored. The control centre preferably includes electronic circuits to provide voltages averaged over periods selected by the operator to match the required time intervals.

A number of probes may be deployed in the sea bed over a desired area and the outputs of those probes can be studied collectively to monitor sediment dynamics over the whole area.

Although the invention has general application in depth measurement, it is particularly suitable for:

(1) Continuous monitoring of beach profiles
(2) Monitoring of sediment accumulation in man-made harbours
(3) Monitoring sedimentation due to dredging operations
(4) Measuring sedimentation in shipping channels e.g. for harbour entry
(5) Detecting erosion around oil rig or jetty pylons
(6) Determining erosion and deposition patterns around groins and breakwaters
(7) Conducting studies of longshore movement
(8) Monitoring beach erosion in storms
(9) Detecting Continental Shelf sediment resuspension due to hurricanes and cyclones
(10) Sediment transport studies
(11) Monitoring estuarine sedimentation.

In its application to sediment level monitoring, the invention utilises the considerable difference in conductivity between sediment and seawater to obtain an indication of the level of sediment relative to a probe. In sediments such as marine sand, the conductivity is dependant upon (a) the conductivity of the "pore-water" between the individual sediment particles and (b) the relative volume of pore-water to sediment. The grains of sand themselves generally have negligible conductivity. In highly compacted sediment, the water fraction is relatively small and the bulk conductivity of the sand is low with the opposite being the case for highly unconsolidated sediment. There are several known empirical expressions which relate the conductivity to the water fraction of sediments. In experimental evaluation of the invention, the conductivity difference between seawater and sediment was found to be up to a factor of approximately 6. The difference in conductivity is used to determine the sediment interface level, and hence the level of sediment relative to a probe which is fixed in position.

The theoretical basis of the invention is explained below with reference to FIG. 1 which is a schematic cross-section of the sediment/seawater interface. A point source of electrical current located at C (at a distance of H below the interface), and carrying a current I will give rise to an electrical field. The electrical field, and hence the voltage potentials associated with this point source, are grossly distorted by the overlying layer of seawater having a conductivity $\sigma_2$ which is different from the conductivity $\sigma_1$ of the sediment layer below it. The measurement of the potential at suitable points can then be used to determine the position of the interface relative to the current electrode.

Figures 1, 2:
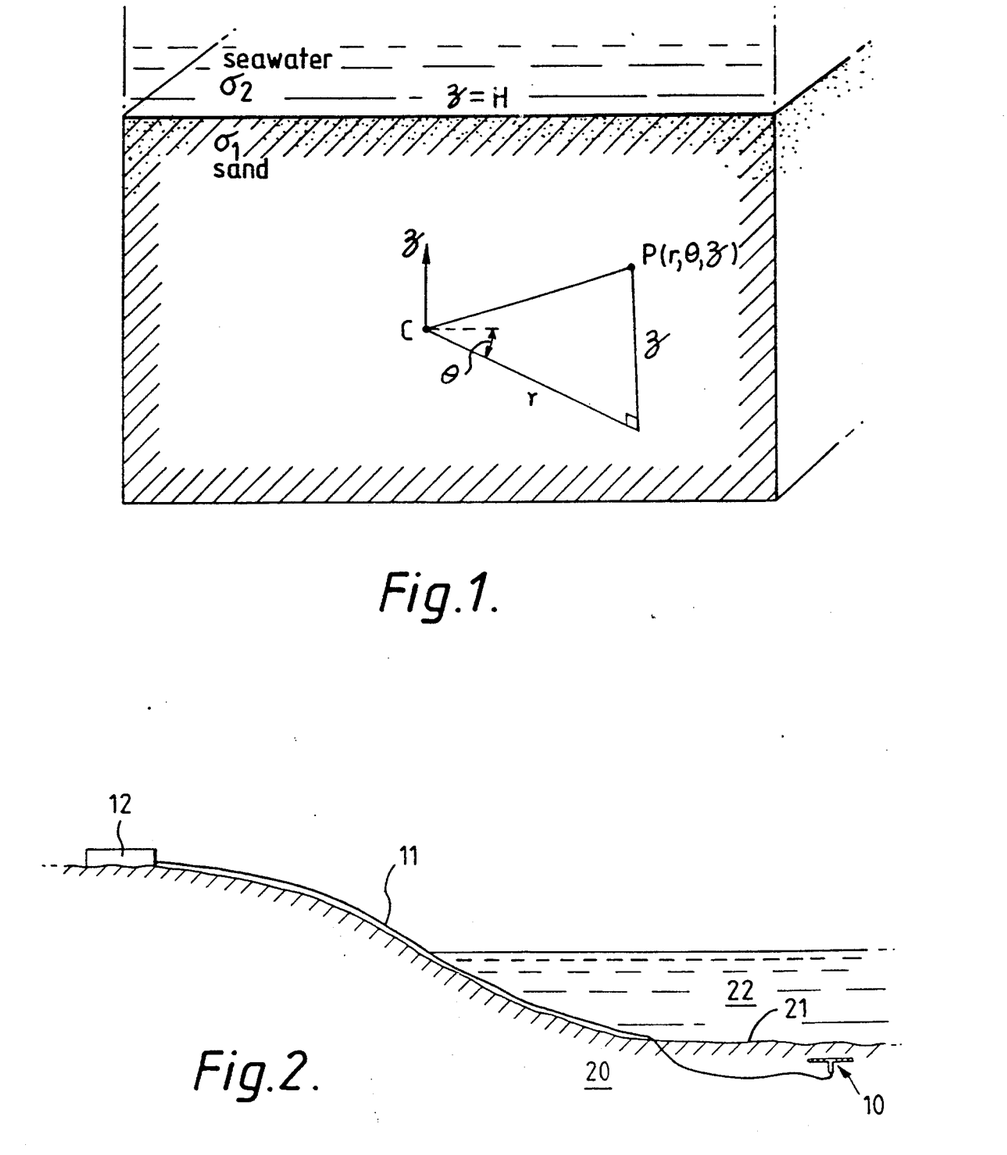
FIG. 1 is a schematic diagram of the sand-seawater boundary for the purposes of illustrating the theory of the invention.
FIG. 2 is a schematic cross-sectional view of the sediment depth measurement apparatus of a first embodiment in situ.

The expressions for the fields are determined using, Laplaces equation, which is satisfied everywhere except at the source itself, i.e.

$$\nabla^2 \psi = 0 \tag{1}$$

where $\psi$ is the potential. The fields in the sediment ($\psi_1$) and seawater ($\psi_2$) are given by the expressions $$\psi_1 = \psi^p + \int_0^\infty [A(\lambda)e^{-\lambda z} + B(\lambda)e^{\lambda z}]J_o(\lambda r)d\lambda \tag{2}$$

$$\psi_2 = \int_0^\infty C(\lambda)e^{-\lambda z}J_o(\lambda r)d\lambda \tag{3}$$

where r and z are cylindrical coordinates as defined in FIG. 1, $J_o$ is a Bessel function of the first kind of order zero and $\lambda$ denotes the integration variable. $A(\lambda)$, $B(\lambda)$ and $C(\lambda)$ are amplitude functions to be determined according to the boundary conditions for $\psi$ at the interface. The subscripts 1 and 2 represent the lower (sediment) and upper (seawater) regions respectively. $\psi^p$, representing the primary excitation is given by $$\psi^p = \frac{I}{4\pi\sigma_1(r^2 + z^2)^{\frac{1}{2}}} \tag{4}$$

The conditions applying at the boundary are continuity of (a) the potential and (b) the normal component of the current at z=H. These conditions are written respectively as $$\psi_1 = \psi_2 \tag{5}$$

$$\sigma_1 \frac{\partial \psi_1}{\partial z} = \sigma_2 \frac{\partial \psi_2}{\partial z} \tag{6}$$

Using Equations (2) to (6) together with the integral relation $$\frac{1}{(r^2 + z^2)^{\frac{1}{2}}} = \int_0^\infty J_o(\lambda r)e^{-\lambda z}d\lambda \tag{7}$$

the expressions for the potentials in the sediment reduce to the relation $$\psi_1 = \frac{I}{4\pi\sigma_1} \left[ \frac{1}{(r^2 + z^2)^{\frac{1}{2}}} + \frac{K}{[r^2 + (2H - z)^2]^{\frac{1}{2}}} \right] \tag{8}$$

and in the water $$\psi_2 = \frac{I}{4\pi\sigma_2} \cdot \frac{(1 - K)}{(r^2 + (2H - z)^2)^{\frac{1}{2}}} \tag{9}$$

where $K = (\sigma_1 - \sigma_2)/(\sigma_1 + \sigma_2)$

Equations 8 and 9 describe the voltage field produced by the current I in terms of the conductivities of the two media and the distance from the point source to the interface. No approximations are involved in the derivation of the expressions. In Equation 8, the first term represents the primary excitation as given in Equation 4 and the second term is the distortion due the interface. (As expected, the second term vanishes as H becomes large or the conductivity of the two media are the same.)

The above equations refer to a point source electrode. In some applications, ring electrodes can be used, in which case equations 8 and 9 become:

$$\psi_1 = \frac{I}{2\pi^2 b\sigma} \left[ \ln\left(1 + \frac{\pi b}{2\sqrt{z^2}}\right) + K \ln\left(1 + \frac{\pi b}{2\sqrt{2H - z^2}}\right) \right] \tag{11}$$

$$\psi_2 = \frac{I(1 - K)}{2\pi^2 b\sigma_2} \left[ \ln\left(1 + \frac{\pi b}{2\sqrt{z^2}}\right) \right] \tag{12}$$

respectively, where b is the radius of the rod.

In order to determine the distance H, i.e. the position of the interface relative to the probe, it is only necessary to measure the voltage ($\psi$) at three different locations. The three resultant equations in the three unknowns, $\sigma_1 \sigma_2$, and H can then be solved numerically. As the measured voltages and currents contain unavoidable experimental error however, it is often advantageous to measure the voltage in more than three locations to increase the accuracy of the method.

It should further be noted that the conductivity of the sand and seawater can be calculated in the above procedure and it is not necessary to determine the variables by independent means. In many instances, it is likely that changes in the conductivity of the seawater will have only a slight influence on the voltage readings. For example, for seawater at 25° C., the conductivity changes from 5.16 S/m to 5.35 S/m when the salinity changes from 34 to 36 ppt. For a sediment conductivity of 1 S/m, the second term in Equation 8 changes by only 1.4%. Thus provided the seawater is much more highly conducting than the sediment, the measurements are mostly insensitive to changes in conductivity of the seawater.

In order that the invention may be more fully understood and put into practice, embodiments thereof will now be described with reference to the accompanying drawings in which.

Figure 3:
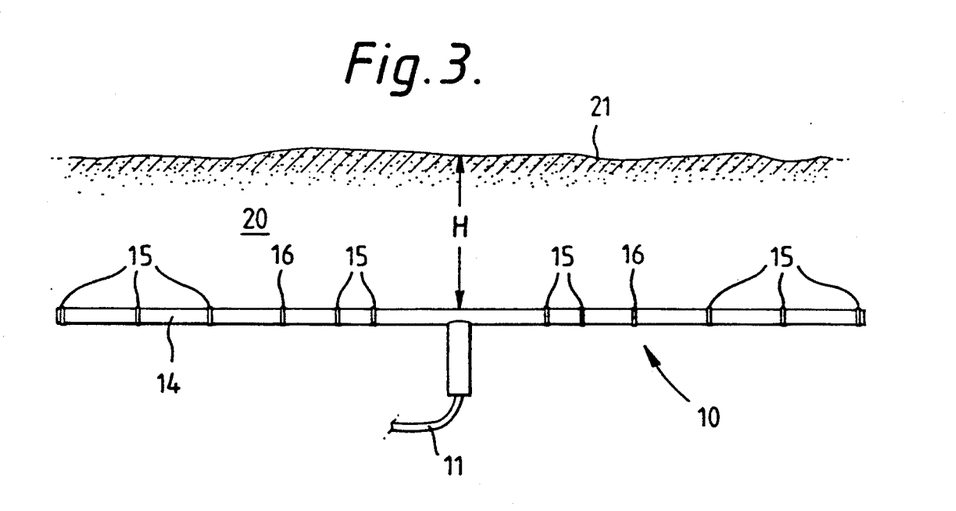
FIG. 3 is a schematic diagram of the probe device of the apparatus of FIG. 2.

As shown in FIGS. 2 and 3, the marine sediment level measuring apparatus of a first embodiment comprises a sensor or probe device 10 deployed in the sea bed 20 at a fixed location. Variations in the level of the sea bed 21 above the probe 10 are detected electrically by utilising the differences in electrical conductivity between the wet sand of the sea bed 20 and the seawater 22 as outlined in the theory above.

The apparatus comprises a control centre 12 which is connected to the probe device 10 by a cable 11. The control centre 12 houses an exciter for providing a current signal on the probe 10, circuits for measuring voltages at electrodes on the probe 10, and preferably electronic computation means, such as a microprocessor, for calculating the depth of sediment above the probe according to the equations stated above. An automatic logging facility for recording changes in marine sediment depth is suitably provided.

The probe 10 is shown in more detail in FIG. 3 and comprises a series of metallic electrodes 15, 16 mounted on a thin insulating rod; for example, the prototype was a PVC plastics tube of 1.06 m length and 0.02 m diameter. The electrodes 15, 16 are typically small conductive rings of 1 mm width spaced symmetrically about the centre of the rod. The electrodes 15, 16 are connected to the control centre 12 by respective wires in cable 11. The rod is filled with epoxy resin to effect a water tight seal. The water proof cable 11 is suitably connected to the rod with a rubber gland.

A 1500 Hz A.C. current is applied across electrodes 16 which are each situated 0.23 m from the centre of the rod 14. Voltage potentials are measured across the remaining symmetric electrode pairs 15 at 0.11 m, 0.16 m, 0.33 m, 0.43 m and 0.53 m from the centre.

Although a D.C. current may be applied to electrodes 16, an AC current source is preferably used to effectively eliminate inaccuracies associated with D.C. electrolytic potentials.

Figure 4:
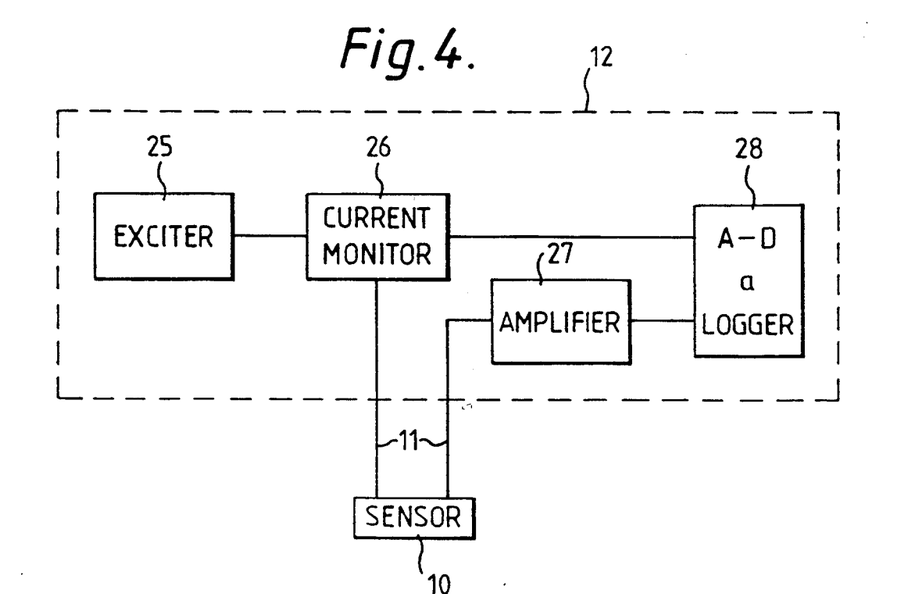
FIG. 4 is a schematic block diagram of the apparatus of the preferred embodiment.

The oscillating current signal is applied across the electrodes 16 by an exciter 25 typically housed in the control centre (see FIG. 4). Although a sinusoidal signal is preferably used, a square wave or any other alternating current signal may suitably be used. The magnitude of the voltage applied across the electrodes 16 is selected according to the dimensions of the sensor 10, the depth sensitivity required, and the resistance of the electrodes. In the preferred embodiment, a 1500 Hz signal with a peak to peak voltage of 2 volts is used, but lower or higher values may be required depending upon the particular application.

The amplitude of the current through electrodes 16 will depend upon the applied voltage and the resistance of the electrodes which, in turn, is dependent upon the physical dimensions of the electrodes and the electrical conductivity of the material in which the electrodes are buried. In the preferred embodiment, current amplitudes of between 0.01 Amp and 0.24 Amp are used, but again lower or higher values may be required depending upon the particular application.

Figure 5:
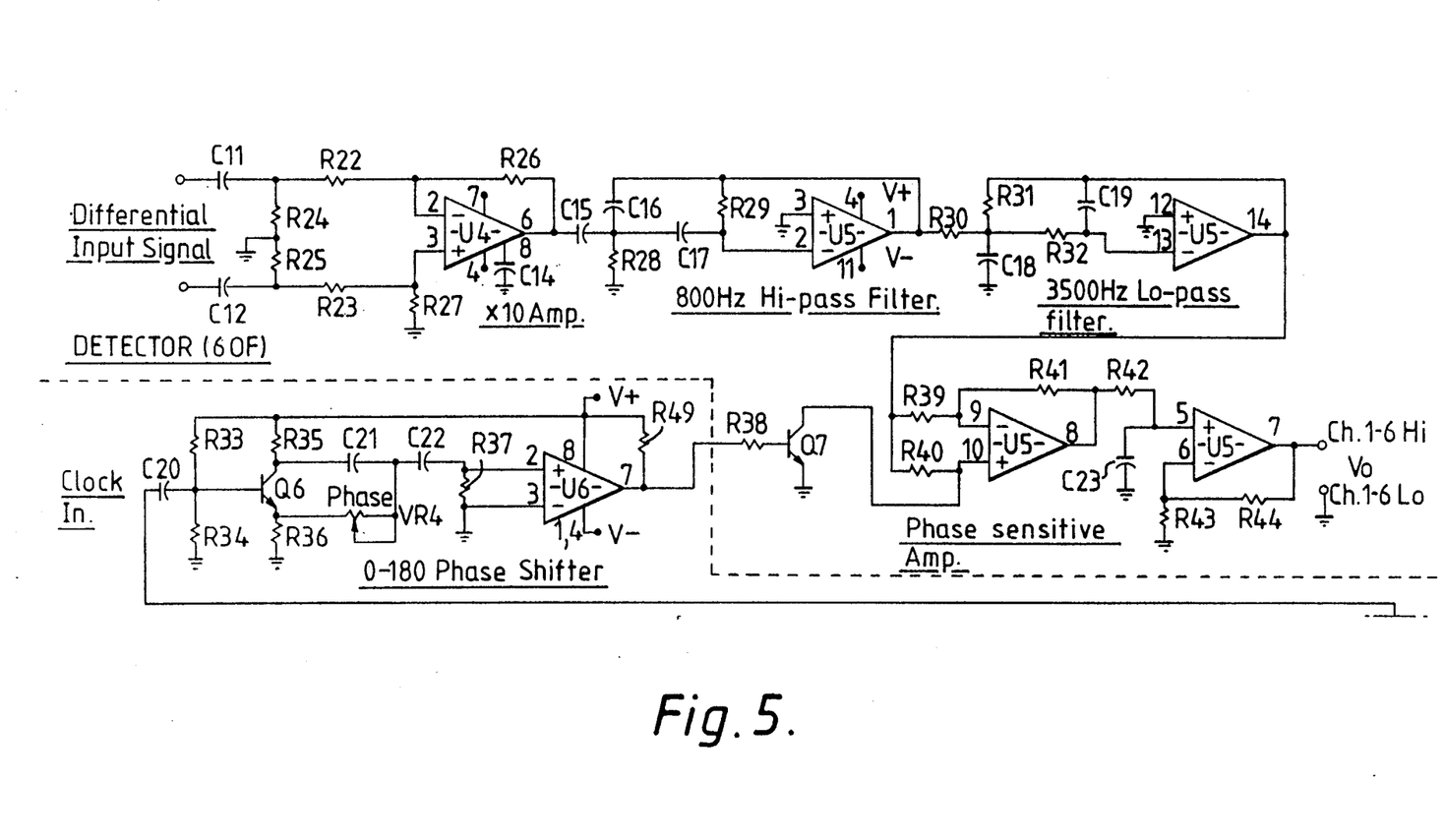
FIG. 5 is a circuit diagram of the circuitry of the control centre of FIG. 4.

The current fed through electrodes 16 is measured by current monitor 26 shown in more detail in FIG. 5. In the preferred embodiment using a sinusoidally oscillating excitation, measurements of Root Mean Square voltage are taken and fed to logger 28.

The detected voltages across electrode pairs 15 of the sensor 10 are amplified by amplifier 27 to a magnitude suitable for the logger 28. The amplifier gain is selected according to the current applied to electrodes 16, the voltage levels that exist across electrode pairs 15, the maximum sensitivity required, and the maximum input voltage range of the logger 28. The voltage levels across electrode pairs 15 depend upon the excitation current, the physical dimensions of the sensor and the conductivity of the materials surrounding the sensor according to the mathematical relations (8) and (9) above. Typically the voltages range from 2 mV to 70 mV. The amplifier 27 may suitably include filtering circuitry (as shown in FIG. 5) to exclude unwanted frequencies caused by external interference.

The logger 28 records time series of the amplified voltage from electrodes 15 on the sensor, and includes analogue to digital conversion circuitry. The analogue to digital (A-D) conversion accuracy required depends upon the necessary voltage sensitivity and the range of voltages likely to be encountered. The minimum voltage sensitivity depends upon the depth measurement sensitivity required, the physical dimensions of the electrodes and electrode spacing, the conductivities of the material in which the sensor 10 is buried, and the applied current. The minimum voltage sensitivity can be determined using equations (8) and (9) above.

In this embodiment, 12 bit A-D accuracy is preferred. However, greater or lower accuracy can be used depending upon the specific application.

The number of logger channels should not be less than the number of electrode pairs 15 on the sensor element 10. Memory capacity and power consumption requirements are selected according to the length of probe deployment period and the sampling interval.

The probe 10 may be calibrated by testing it in an effectively infinite body of seawater of known conductivity.

Experimental results obtained from using the probe illustrated in FIG. 3 showed that the calculated depth was usually within 5% of true depth, provided that the total length of the rod was at least twice the burial depth.

Although only three sets of voltage measuring electrodes 15 are required, five sets are used on the probe of the preferred embodiment to improve accuracy. It is to be noted that the depth of the sediment can be calculated without the need to measure the conductivities of the sediment and seawater by independent methods.

FIGS. 6 to 9 illustrate another embodiment of the invention which is particularly suitable for measuring changes in the level of the sediment/seawater interface for fine sediments in which level changes may be very small i.e. <1 mm. A vertical probe or sensor device 30 is held in place by a support bracket 31 connected to a finned support stake 32 shown in more detail in FIG. 7. Fins 33 are provided on the support stake 32 to ensure that movement of the sensor 30 is minimal in the event of strong tidal currents or waves. Data is passed directly from sensor 30 to an underwater control centre 35 via cable 34.

Figure 6:
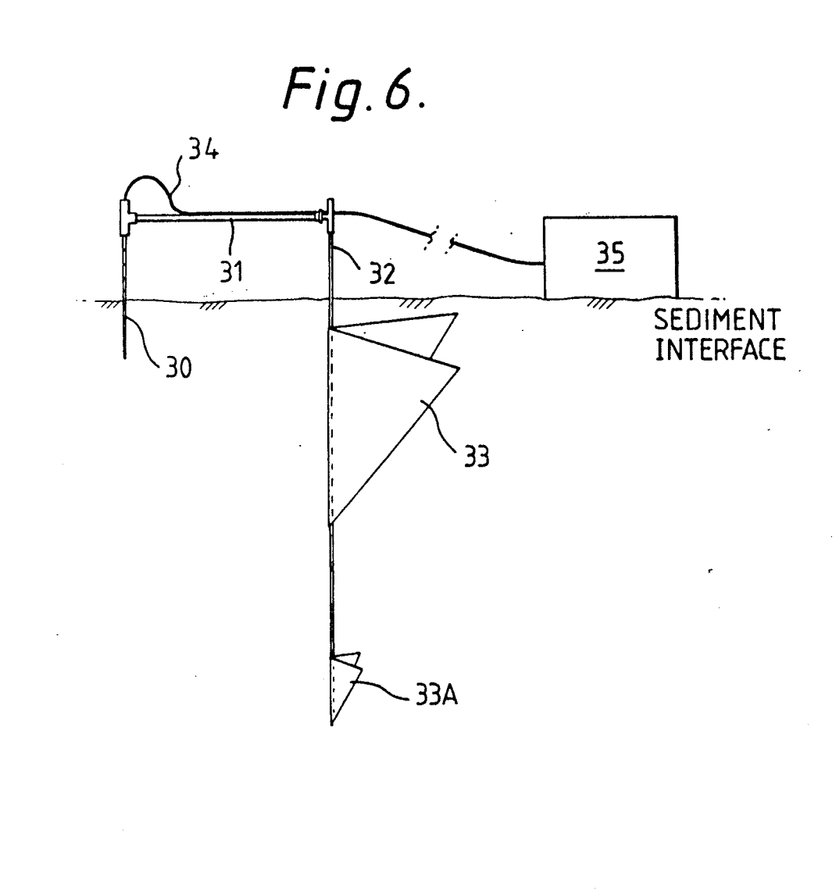
FIG. 6 is a schematic diagram of another embodiment of a sediment depth measurement apparatus.
Figure 7:
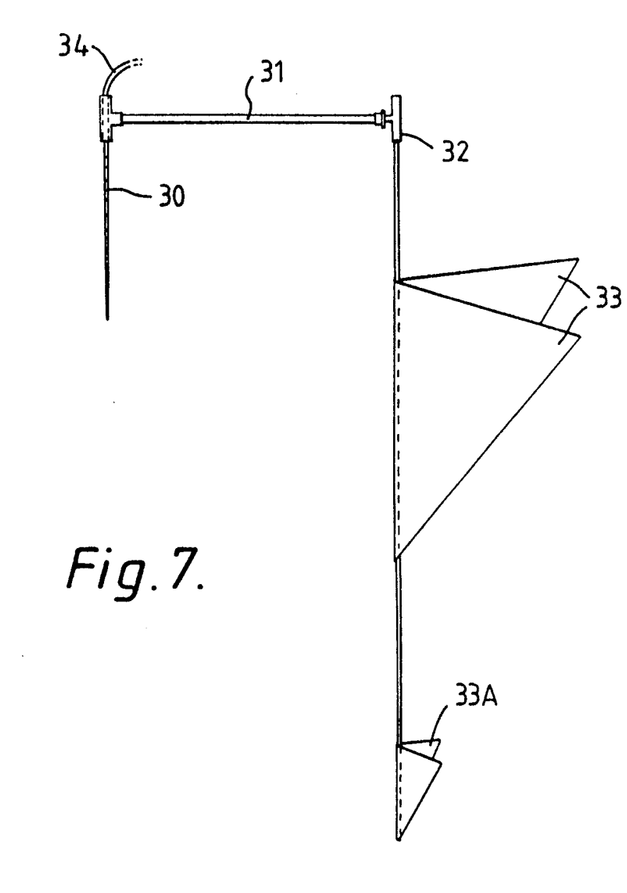
FIG. 7 is an elevational view of the sensor of FIG. 6.

The illustrated rod 36 is typically of the order of 160 mm in length. However, for applications in which large sediment variations may occur, a much longer rod will be required.

With a vertically orientated sensor 30, greatest sensitivity is achieved when the sediment/water interface is between the top and bottom current electrodes i.e. when the sensor rod 36 is only partially embedded as shown in FIG. 6.

Figure 10:
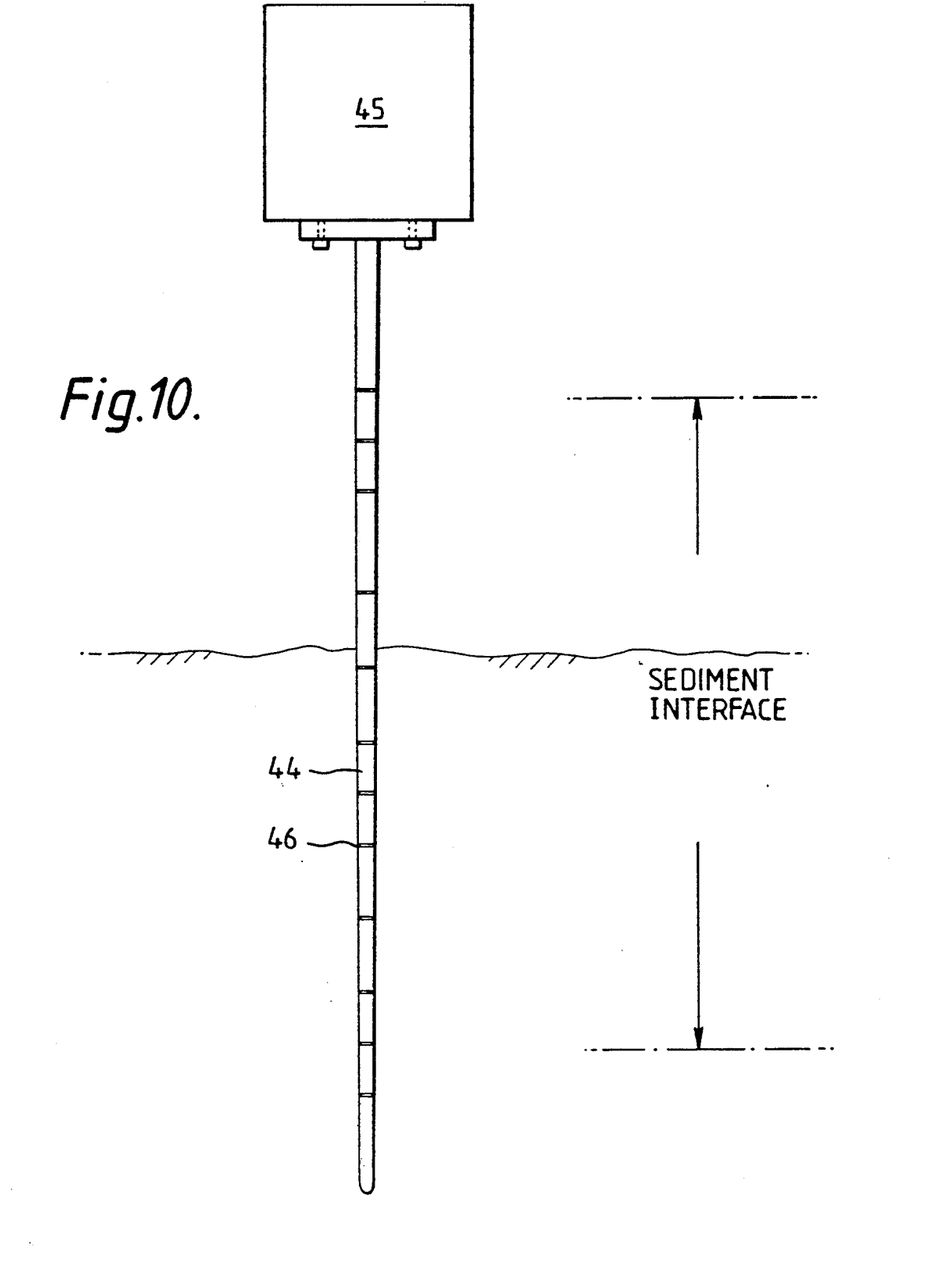
FIG. 10 is a schematic view of another embodiment of the invention.

If the sensor were to be used on a beach for example, where sediment fluctuations of 1 m or more could be expected, the sensor rod would be of correspondingly greater length, e.g. at least 1 m. Under these circumstances a more robust sensor would be required. FIG. 10 illustrates one such arrangement comprising a rod 44 of sufficient strength to enable a control centre 45 to be mounted on the top thereof.

Figure 8:
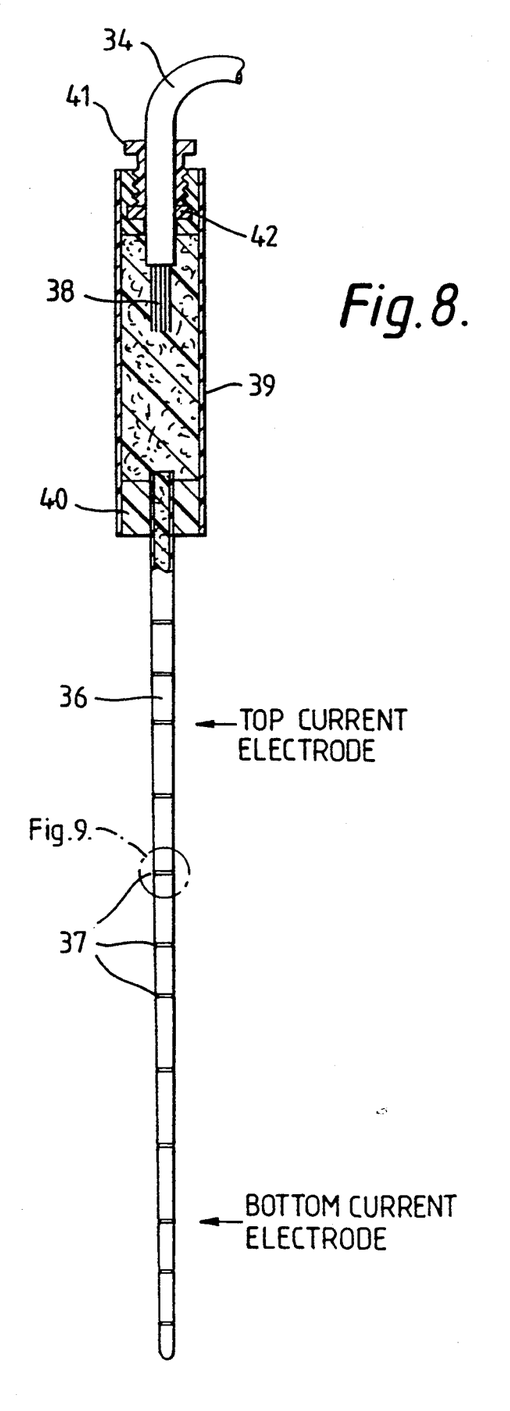
FIG. 8 is a partial sectional elevation of the sensor rod of FIG. 7.
Figure 9:
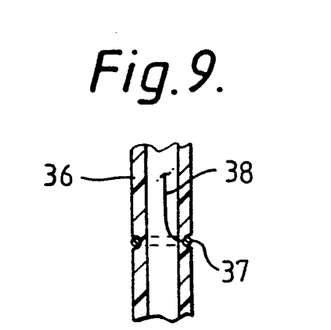
FIG. 9 is a sectional view of part of the sensor rod of FIG. 7.

The sensor 30 is shown in more detail in FIG. 8 and comprises a rod 36 which may suitably be a tapered fibreglass tube of 1 mm wall thickness, filled with epoxy. Electrodes 37 are provided at predetermined spaced locations on the rod 36. These electrodes 37 typically comprise rings of wire of 0.25 mm diameter, in recessed mounts so as to be flush with the outer surface of rod 36 as shown more clearly in FIG. 9. Each electrode 37 is connected to a respective wire in cable 34 by internal connecting wires 38.

The rod 36 is held in an end mount 39 by means of a suitable fitting 40. The end mount 39 may comprise an epoxy resin filled 15 mm diameter PVC plastics tube, while the fitting 40 may be a collar fitting providing a firm sealed connection between rod 36 and end mount 39. The cable 34 is connected to the end mount 39 in any suitable manner, for example by gland 42 and associated gland nut 41.

The foregoing describes only some embodiments of the invention, and modifications which are obvious to those skilled in the art may be made thereto without departing from the scope of the invention as claimed in the following claims.

For example, the actual geometry and physical dimension of the probe will be modified to suit its intended use. A probe designed to measure the large changes in sediment depth that occur on surf beaches may be unsuitable for use on estuaries where smaller ranges but increased sensitivity is required. Although the configuration of the actual probe may vary, the basic principle of operation remains the same however.

Moreover, the theory of operation can be extended to take into account multiple layers which may be present in the sediment. In this case, the electronic computation means can be programmed to allow for the multiple layers in the sediment.

A number of probes 10 can be connected to a single control centre 12 via respective cables 11 in order to study and monitor sediment dynamics over a particular area.

Furthermore, a first active probe (or set of probes) can be used to inject alternating current or direct current into the sediment, and a separate second observation probe (or set of probes) can be used to sense the potential field resulting from that current, as distorted by the sediment/seawater boundary.

Finally, although the above described embodiments are described in terms of the location of the sea floor relative to the buried probe, the invention is not limited to sea floor sediments and can be applied to the location of conductivity boundaries in other layered structures.

The claims defining the invention are as follows:

1. A method of measuring changes in underwater sediment level, the method comprising steps of:
   deploying a probe device at a fixed location within operative range of the surface level of the sediment;
   establishing a source of current at the probe device to create an electric field therearound;
   measuring the voltage potential at at least three positions on the probe device at known distances from the current source; and
   calculating the distance of the surface level of the sediment from the probe device at successive time intervals.

2. A method as in claim 1, wherein the sediment level which is measured is seabed level and the probe device is an elongate member at least partially embedded in the sediment.

3. Apparatus for measuring changes in underwater sediment level, comprising:
   probe means adapted to be deployed in use at a fixed location within operative range of the sediment/water interface, the probe means having (i) a current source for establishing an electrical field therearound, and (ii) voltage sensing means at at least three locations at known positions relative to the current source;
   means for measuring the voltage at each voltage sensing means; and
   electronic computation means connected to the probe means and the voltage measuring means for calculating the distance of the sediment/water interface from the probe means at successive intervals of time.

4. Apparatus as in claim 3, wherein said probe means is an elongate member which, in use, is at least partially embedded in the sediment.

5. Apparatus as in claim 3, wherein said electronic computation means comprises a microprocessor, said apparatus further comprising data logging means for recording the distance of the sediment/water interface from the probe means at said successive intervals of time.

6. Apparatus as in claim 3, wherein said electronic computation means and said data logging means are housed in a control centre located remotely from the probe means, and connected thereto by an electric cable.

7. Apparatus as in claim 3, wherein said probe means is connected to a stake member adapted to be deployed in the sediment.

8. Apparatus as in claim 3, wherein the probe means comprises a plurality of probes at spaced locations and connected to said electronic computation means.

9. Apparatus as in claim 3, wherein the probe means comprises an elongate tubular member, and the voltage sensing means comprises ring electrodes.

10. Apparatus as in claim 3 wherein the current source comprises a pair of electrodes on the probe means to which an AC voltage potential is applied so as to cause alternating current to pass between the electrodes.

11. Apparatus as in claim 3, wherein the voltage sensing means are located on the same probe as the current source.

12. A method of monitoring changes in underwater sediment level, comprising the steps of:
deploying a probe device at a fixed location within operative range of the sediment/water interface,
establishing a source of current at the probe device to create an electric field therearound,
measuring the voltage potential at at least three positions at known distances from the current source,
calculating the distance of the sediment/water interface from the probe device using predetermined equations, and
repeating the preceding step at selected time intervals to monitor changes in the sediment level.

13. A method as in claim 12, wherein the voltage potential is measured at positions on the probe device.

14. A method as in claim 12, wherein the probe device is embedded at least partially in the sediment.

15. A method as in claim 12, wherein the step of calculating the distance of the sediment/water interface from the probe device is performed by electronic computing means.

16. A method as in claim 12, wherein the source of current comprises alternating current between a pair of electrodes on the probe.

17. A method as in claim 12, wherein the voltage measurements are converted to digital form, and processed digitally.

18. A method as in claim 12, wherein the probe is fully embedded generally horizontally in the sediment.

19. A method as in claim 12, wherein the probe is partially embedded in an upright configuration in the sediment.

* * * * *